Feb. 4, 1964     W. C. STRUMPELL     3,120,340
BLOWER
Filed Dec. 1, 1961

WINTON C. STRUMPELL
*INVENTOR.*

KENDRICK, SCHRAMM & STOLZY
BY
*A. Harold Stolzy*
ATTORNEY.

United States Patent Office 3,120,340
Patented Feb. 4, 1964

3,120,340
BLOWER
Winton C. Strumpell, 6027 Corning Ave.,
Los Angeles, Calif.
Filed Dec. 1, 1961, Ser. No. 156,322
2 Claims. (Cl. 230—117)

This invention relates to air circulation systems, and more particularly to a blower having an outlet which may be adjusted to establish an air stream in any direction throughout a large angular range.

Although the present invention is by no means limited in its scope of application to air cooling systems in cabinets housing electronic equipment, it has been found especially useful in that regard. Under such conditions only certain "hot spots" exist. That is, a nominal amount of air circulation is required to cool a great majority of electrical circuit components and troublesome high temperature locations often exist only in isolated positions.

In the past, blower outlets have not been adjustable. This means that considerable blower power was wasted because inaccurate blower outlet locations made necessary the use of several blowers of an unusually large size.

The present invention overcomes the above-described and other disadvantages of the prior art by providing a blower including an intake passageway having an inlet opening through one side wall thereof; a cylindrical hollow impeller housing having an inlet opening in one side wall thereof, the impeller housing also having an opening at one position around its periphery and support means holding the impeller housing in a position with the side wall thereof contiguous to the side wall of the intake passageway and in a position such that the inlet openings have substantially the same axis, the support means being adjustable to permit rotation of the impeller housing about the axis to a selected position. Due to the fact that the impeller housing of the present invention may be located at any selected position within a large angular range, it is possible to direct a stream of air emanating from the peripheral opening therein directly toward a "hot spot" location in a cabinet housing electronic equipment. Due to this rapid and efficient dissipation of a large amount of heat in this manner, it is possible to maintain the temperature of the equipment in high heat source locations at a reasonable level without the use of substantial power to drive several blowers of an unusually large size.

According to a feature of the invention releasable clamp means such as a split ring and draw bolts are provided on an electric motor housing having an impeller housing connected to each side of it, the motor having a drive shaft extending from its opposite ends into each corresponding impeller housing to carry an impeller therein. The clamp means are fixed relative to two intake passageways, one for each impeller housing. The split ring thus may be loosened to permit rotation of the impeller housings together with the motor to direct air emanating from peripheral openings therein at any selected position within a large angular range. This range may even be increased by taking the draw bolts off of the split ring and turning the motor and impeller housing assembly end for end.

In addition to the foregoing, it is also a feature of the present invention that the impeller housings are fixed to the motor in a manner such that their angular positions relative to each other may be adjusted. The peripheral opening in one impeller housing may be located at the same angular position as that of the peripheral opening in the other impeller housing. Alternatively, however, the peripheral opening in the one housing may be located in an angular position different from that of the peripheral opening in the other housing.

The above-described and other advantages of the present invention will be better understood from the following description when considered in connection with the accompanying drawings.

In the drawings, which are to be regarded as merely illustrative:

Figure 1:
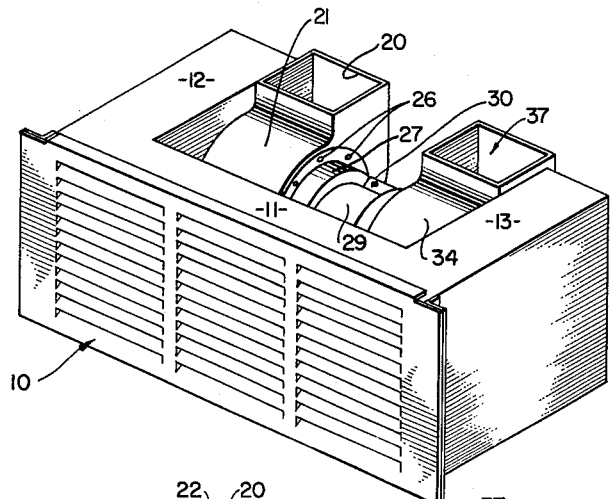
FIG. 1 is a perspective view of one embodiment of the present invention.
Figure 3:
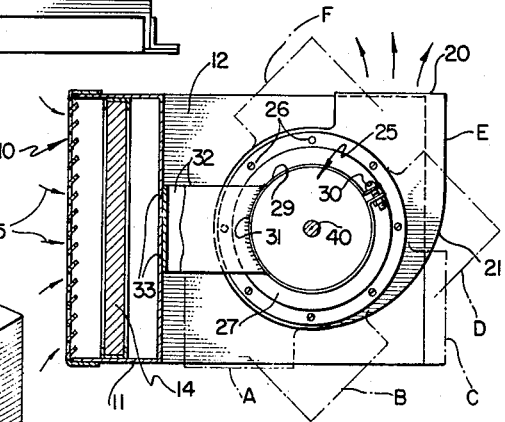
FIG. 3 is a transverse sectional view of the blower.

In the drawing in FIG. 1 an air intake louver assembly is indicated at 10 covering the front of a header 11 which communicates with air intake passageways 12 and 13. As shown in FIG. 3, air passing through louver assembly 10 may be cleaned by a filter 14 that runs the full length of header 11.

Air passing through louver assembly 10, as indicated at 15 in FIG. 3, thus enters header 11, passes through filter 14 and enters intake passageways 12 and 13 at their ends adjacent header 11. Air then flows out of an inlet opening 16 in intake passageway 12 as indicated at 17. This air immediately enters the interior of a cylindrically shaped rotor 18 which carries impeller blades 19 to establish an airstream at a peripheral opening 20 in an impeller housing 21 which surrounds rotor 18.

Opening 16 in intake passageway 12 is provided with a flange 22 around which a resilient ring 23 is positioned to seal with the edge of an inlet opening 24 in impeller housing 21 that lies in registry with intake passageway opening 16.

Figure 2:
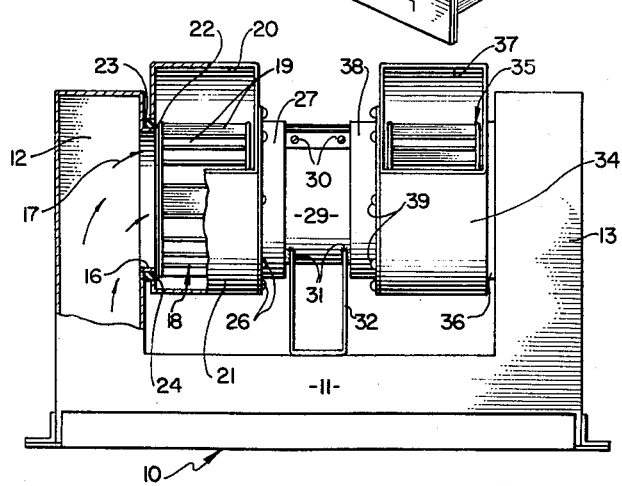
FIG. 2 is a top plan view of the blower shown in FIG. 1.

Impeller housing 21 is mounted on an electric motor 25 by metal screws 26 connecting it to an extension 27 of housing 28 thereof. Motor 25, in turn, is fixed in position relative to intake passageways 12 and 13 by a split ring 29 that surrounds housing 28 and is held tightly therearound by draw bolts 30. Split ring 29 is welded at 31 to a bracket 32 which, in turn, is welded at 33 to header 11. This construction can perhaps best be seen in FIGS. 2 and 3.

Except for the fact that a second impeller housing indicated at 34 is located on the right rather than the left side of motor 25, it and its adjacent structures may be identical to those heretofore described. For example, a rotor 35 located therein may be identical to rotor 18. Ring 36 may be identical to ring 23; opening 37 identical to opening 20; motor housing portion 38 identical to motor housing portion 27; and screws 39 identical to screws 26.

Figure 4:
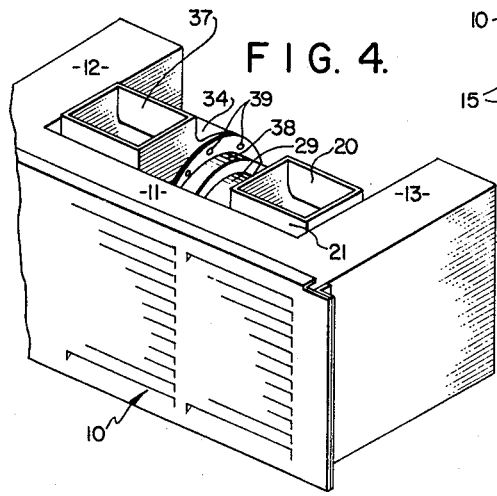
FIG. 4 is a portion of a perspective view of a blower with the impeller housing assembly shown in FIGS. 1, 2 and 3 turned end for end.

It will be noted that the impeller housing and motor assembly have been turned end for end in FIG. 4 so that impeller housing 34 is adjacent intake passageway 12 and impeller housing 21 is adjacent intake passageway 13. Note will be taken that peripheral openings 20 and 37 may be located in any position within an angular range of 225 degrees and that by turning the impeller housing and motor assembly end for end that some additional versatility may be achieved.

In particular, for example, peripheral openings 20 and 37 may be located in positions indicated at A, B, C, D, E and F in FIG. 3. Still further, one opening, e.g. 20, may be located in the position indicated in solid lines in FIG. 3 and opening 37 located in any of the positions indicated at A to F, inclusive, in FIG. 3. The position of both impeller housings 21 and 34 is adjustable by loosening drawbolts 30 and turning motor 25 in split ring 29. Drawbolts 30 must, of course, be removed if the impeller housing and motor assembly are turned end for end, e.g. from the position shown in FIG. 1 to the position shown in FIG. 4.

The adjustment of opening 20 relative to opening 37 is made by removing screws 26.

In light of the foregoing, it will no doubt be apparent that motor 25 is provided with a drive shaft 40 so indicated in FIG. 3 which projects beyond both ends of motor housing 28 and is fixed at each end to each corresponding rotor 18 and 35.

From the foregoing, it will be appreciated that the positions of impeller housings 21 and 34 may be adjusted to direct air emanating from openings 20 and 37, respectively, directly toward "hot spots" in a cabinet containing electronic equipment to keep the temperature thereof at a reasonably low level. Further, the blower of the present invention may be relatively small, the amount of power required for cooling thus being substantially reduced.

Although only two specific embodiments of the invention have been shown or described herein, many changes and modifications thereof will, of course, suggest themselves to those skilled in the art. The invention is therefore not to be limited to the embodiments disclosed, the true scope thereof being defined only in the appended claims.

What is claimed is:

1. A blower comprising: a pair of intake passageways having inlet openings in facing sidewalls thereof; a pair of hollow impeller housings, each of said impeller housings having one sidewall and an inlet opening through said one side wall, each of said impeller housings also having an opening at one position around its periphery; a hollow cylindrically shaped rotor in each of said impeller housings, each of said rotors having impeller blades at its periphery to draw air from a corresponding intake passageway and to direct the same through the peripheral opening in a corresponding impeller housing; an electric motor having one of said rotors fixed to one end of its drive shaft and the other fixed to the other end thereof, one of said impeller housings being fixed to one side of said motor and the other of said impeller housings being fixed to the other side of said motor, said motor having an approximately cylindrical housing; a bracket fixed in position relative to said intake passageways; and clamp means on said bracket extending around and engaging said motor housing to support it and said impeller housings in a position such that the inlet opening in one of said impeller housings lies contiguous to and in registry with the inlet opening in one corresponding intake passageway and the inlet opening in the other of said impeller housings lies contiguous to and in registry with the inlet opening in the other corresponding intake passageway, said clamp means being releasable to permit rotation of said impeller housings and said motor about the axis thereof to a selected position.

2. The invention as defined in claim 1, wherein means are provided to fix said impeller housings to said motor in a manner such that the peripheral opening in one may be located at one of a plurality angular positions relative to that of the other.

References Cited in the file of this patent

UNITED STATES PATENTS

| 1,030,962 | Bartlett | July 2, 1912 |
| 2,337,325 | Hach et al. | Dec. 21, 1943 |
| 2,710,573 | Marker | June 14, 1955 |